(12) United States Patent
Moriarty

(10) Patent No.: US 6,586,903 B2
(45) Date of Patent: Jul. 1, 2003

(54) ROTOR POSITION MONITORING OF A RELUCTANCE DRIVE

(75) Inventor: Peter Mark Moriarty, Knaresborough (GB)

(73) Assignee: Switched Reluctance Drives Ltd., Harrogate (GB)

(*) Notice: Subject to any disclaimer, the term of this patent is extended or adjusted under 35 U.S.C. 154(b) by 0 days.

(21) Appl. No.: 09/734,427

(22) Filed: Dec. 11, 2000

(65) Prior Publication Data

US 2001/0010452 A1 Aug. 2, 2001

(30) Foreign Application Priority Data

Dec. 15, 1999 (GB) ............................... 9929655

(51) Int. Cl.[7] ................................. H02P 1/46
(52) U.S. Cl. ................... 318/701; 318/800; 318/802; 318/254; 318/138; 318/439
(58) Field of Search .................. 318/701, 254, 318/138, 439, 800, 802

(56) References Cited

U.S. PATENT DOCUMENTS

| | | | | |
|---|---|---|---|---|
| 4,074,179 A | | 2/1978 | Kuo et al. ................. 318/696 |
| 5,015,939 A | * | 5/1991 | Konecny ................... 318/701 |
| 5,589,751 A | * | 12/1996 | Lim .......................... 318/254 |
| 5,689,165 A | * | 11/1997 | Jones et al. ................ 318/254 |
| 5,793,179 A | | 8/1998 | Watkins ..................... 318/701 |
| 5,859,518 A | * | 1/1999 | Vitunic ...................... 318/254 |
| 5,864,217 A | * | 1/1999 | Lyons et al. ............... 318/652 |
| 5,920,175 A | * | 7/1999 | Jones et al. ................ 318/254 |
| 5,955,861 A | * | 9/1999 | Jeong et al. ............... 318/254 |
| 6,051,942 A | * | 4/2000 | French ....................... 318/254 |
| 6,153,956 A | * | 11/2000 | Branecky ................. 310/68 B |

FOREIGN PATENT DOCUMENTS

| | | |
|---|---|---|
| EP | 0 470 685 A1 | 2/1992 |
| EP | 0 573 198 A1 | 12/1993 |
| EP | 0 780 966 A2 | 6/1997 |
| EP | 0 856 937 A2 | 8/1998 |
| WO | WO 91/02401 | 2/1991 |

OTHER PUBLICATIONS

Mvungi, N.M., et al., "Accurate Sensorless Rotor Position Detection in an SR Motor," EPE Firenze, vol. 1, 1991, pp. 390–393.

Ray, W.F., et al., "Sensorless Methods for Determining the Rotor Position of Switched Reluctance Motors," EPE Brighton, 1993, pp. 7–13.

Gallagos–Lopez, G., et al., "A New Rotor Position Estimation Method for Switched Reluctance Motors Using PWM Voltage Control," EPE '97 Trondheim, 1997, pp 3.580–3.585.

Gallegos–Lopez, Gabriel, et al., "A New Ssnsorless Method for Switched XP–000848025 Reluctance Motor Drives", IEEE Transactions on Industry Applications, vol. 34, No. 4, Jul.–Aug. 1998.

* cited by examiner

Primary Examiner—Rita Leykin
(74) Attorney, Agent, or Firm—Dicke, Billig & Czaja, P.A.

(57) ABSTRACT

A reluctance drive includes a stator, a phase winding (16) on the stator, a rotor (12) that is movable relative to the stator, a controller for applying a current to the phase winding (13), and a sensor for measuring the phase current in the winding (16). Aspects of the invention detect when the phase current has passed its peak, compute when the peak phase current occurred using information on when the phase current passed its peak, determine rotor position using the computed position of the peak phase current.

25 Claims, 6 Drawing Sheets

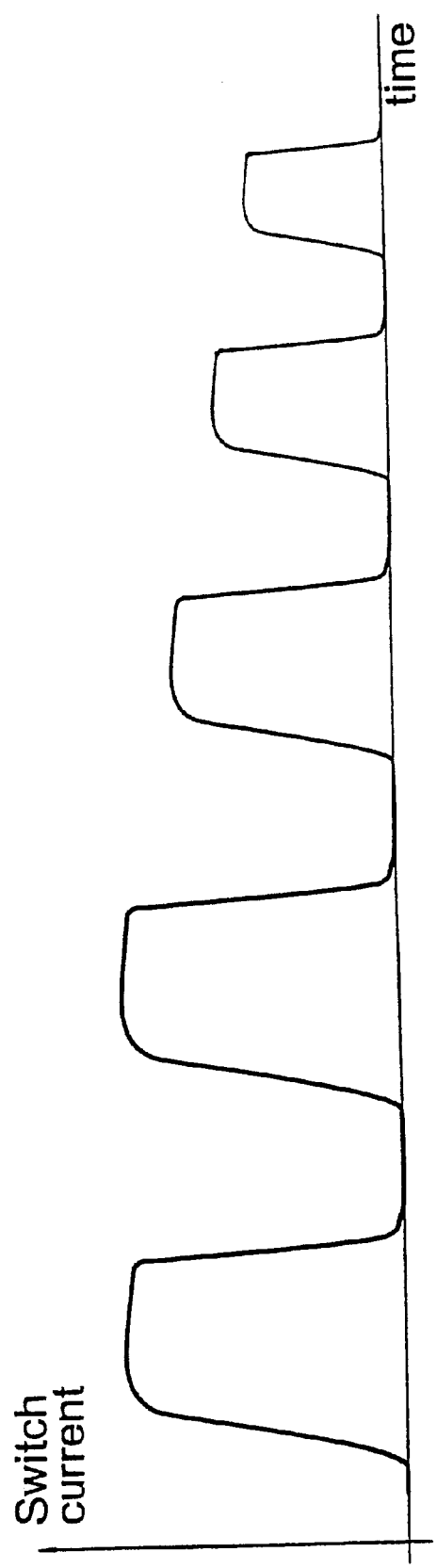

ROTOR POSITION MONITORING OF A RELUCTANCE DRIVE

CROSS-REFERENCE TO RELATED APPLICATION

The subject matter of this application is related to the subject matter of Application No. GB 9929655.0, filed Dec. 15, 1999, priority to which is claimed under 35 U.S.C. §119 and which is incorporated herein by reference.

BACKGROUND OF THE INVENTION

1. Field of the Invention

This invention relates to sensorless rotor position monitoring in reluctance machines, particularly in switched reluctance machines.

2. Description of Related Art

The control and operation of switched reluctance machines generally are described in the paper "The Characteristics, Design and Applications of Switched Reluctance Motors and Drives" by J M Stephenson and R J Blake delivered at the PCIM'93 Conference and Exhibition held in Nurnberg, Germany, Jun. 21–24, 1993 and incorporated herein by reference. In that paper the "chopping" and "single-pulse" modes of energization of switched reluctance machines are described for operation of the machine at low and high speeds respectively.

A typical art drive is shown schematically in FIG. 1 driving a load 19. This includes a DC power supply 11 that can be either a battery or rectified and filtered AC mains. Connected in parallel with the power supply 11 is a capacitor 25. The DC voltage provided by the power supply 11 is supplied across lines 26 and 27 and switched across phase windings 16 of the motor 12 by a power converter 13 under the control of the electronic control unit 14. For proper operation of the drive, the switching must be correctly synchronized to the angle of rotation of the rotor. One of the many known converter topologies is shown in FIG. 2, where a resistor 28 is connected in series with an upper switch 21, and with a lower switch 22 to provide a current feedback signal.

The performance of a switched reluctance machine depends, in part, on the accurate timing of phase energization with respect to rotor position. Detection of rotor position is conventionally achieved by using a transducer 15, shown schematically in FIG. 1, such as a rotating toothed disk mounted on the machine rotor, which cooperates with an optical or magnetic sensor mounted on the stator. A pulse train indicative of rotor position relative to the stator is generated and supplied to control circuitry, allowing accurate phase energization.

This system is simple and works well in many applications. However, the rotor position transducer increases the overall cost of assembly, adds extra electrical connections to the machine and is, therefore, a potential source of unreliability. In addition, at high speeds, the windage associated with the vane is a source of additional loss.

Various methods for dispensing with the rotor position transducer have been proposed. Several of these are reviewed in "Sensorless Methods for Determining the Rotor Position of Switched Reluctance Motors" by W F Ray and I H Al-Bahadly, published in the Proceedings of The European Power Electronics Conference, Brighton, UK, Sep. 13–16, 1993, Vol. 6, pp 7–13, which is incorporated herein by reference.

Many of the methods proposed for rotor position estimation use the measurement of phase flux-linkage (i.e. the integral of applied voltage with respect to time) and current in one or more phases. Position is calculated using knowledge of the variation in inductance of the machine as a function of angle and current. This characteristic can be stored as a flux-linkage/angle/current table and is depicted graphically in FIG. 3. The storage of this data involves the use of a large memory array and/or additional system overheads for interpolation of data between stored points.

Some methods make use of this data at low speeds where "chopping" current control is the dominant control strategy for varying the developed torque. Chopping control is illustrated graphically in FIG. 4($a$) in which the current and inductance waveforms are shown over a phase inductance period. (Note that the variation of inductance is depicted in idealized form.) These methods usually employ diagnostic energization pulses in non torque-productive phases (i.e. those phases which are not energized directly from the power supply at a particular moment). A method suited to low-speed operation is that proposed by N M Mvungi and J M Stephenson in "Accurate Sensorless Rotor Position Detection in an S R Motor", published in Proceedings of the European Power Electronics Conference, Firenze, Italy, 1991, Vol.1, pp 390–393, incorporated herein by reference.

Other methods operate in the "single-pulse" mode of energization at higher speeds. This mode is illustrated in FIG. 4($b$) for motoring, in which the current and inductance waveforms are shown over a phase inductance period. It will be realized that the current waveforms for generating are mirror images of the motoring waveforms. These methods monitor the operating voltages and currents of an active phase without interfering with normal operation. A typical higher speed method is described in International Patent Application WO 91/02401, which is incorporated herein by reference.

Both the chopping and single-pulse modes described above are normally used when the converter applies a fixed value of supply voltage to the phase windings. A further mode of control is the pulse width modulated (PWM) mode, where one or more switches are switched rapidly to effectively produce a winding voltage that is proportional to the duty cycle of the PWM waveform. This allows the use of single-pulse type current waveforms at much lower speeds than would be possible on the full supply voltage. The current waveform could appear, at first sight, to be the same as that in FIG. 4($b$), but closer examination would reveal that it was made up of a large number of segments, corresponding to the current carried by the switches and diodes respectively. Such operation is well known in the art and will not be described in further detail.

Having to store a two-dimensional array of machine data in order to operate without a position sensor is an obvious disadvantage. Alternative methods have been proposed, which avoid the need for the majority of angularly referenced information and instead store data at one angle only. One such method is described in European Patent Application No. EP-A-0573198 (Ray), incorporated herein by reference. This method aims to sense the phase flux-linkage and current at a predefined angle by adjusting the diagnostic point via the calculated deviation away from the desired point. Two one-dimensional tables are stored in the preferred embodiment, one of flux-linkage versus current at a referenced rotor angle and another of the differential of flux-linkage with respect to rotor angle versus current. By monitoring phase voltage and current, the deviation away from a predicted angle can be assessed, with the aid of the look-up tables, and system operation can be adjusted accordingly. However, such methods, although reducing the amount of information which has to be stored, still have to detect or compute the flux-linkage at a specific rotor angle and may be sensitive to repeatability or manufacturing tolerances in the machine.

A similar approach is disclosed in U.S. Pat. No. 5,793,179 (Watkins), incorporated herein by reference, where the arrival of the rotor at the peak of the inductance profile is predicted and the system is then put into a freewheeling mode, during which the gradient of the current is measured. A measurement of zero gradient is taken to indicate that the predicted point has been reached. While this works well in the absence of noise, it is not robust enough to disregard false readings produced by a noisy current waveform. Though the current waveform may be relatively immune to induced noise, a drive which uses a PWM voltage supply will generate a current waveform having a saw-tooth superimposed on a smooth variation. This form of waveform effectively has a large noise content. In any case, the method of '179 cannot be used with a converter circuit which is not capable of freewheeling.

Other authors have attempted to overcome these deficiencies. One method is described in the paper "A New Rotor Position Estimation Method for Switched Reluctance Motors using PWM Voltage Control", by Gallegos-Lopez, G, Kjaer, P C & Miller, T J E, in Proc EPE'97, 7th European Conf on Power Electronics and Applications, Sep. 8–10 1997, Trondheim, Norway, Vol 3, pp 580–585, incorporated herein by reference. This paper discusses a method of continuously sampling the current waveform and attempting to detect the change in gradient which is produced by the start of pole overlap and the consequent sudden rise in inductance of the phase (see FIG. 4($b$)). The basic method described by Gallegos-Lopez et al involves detecting the point of pole overlap for motoring (or pole separation for generating) by detecting where the rate of change of the current waveform, with respect to time, is zero. The method of detection uses discrete circuitry, including a differentiator, a comparator and a single shot multivibrator. The differentiator differentiates the current signal, so that at the point of zero di/dt the differentiator output is zero. The comparator is set up to detect this zero output from the differentiator and to flip state.

While the system does not require either stored magnetization data or an interval of freewheeling, it requires a high-grade form of current feedback and even then it has been found in practice that it cannot work reliably in the presence of noise, which generates spurious estimates of position. In addition, it cannot be used reliably with a low-cost form of current sensing, e.g. the resistor 28 in the bottom of the phase leg of FIG. 2, since the current information disappears when the switch is opened.

It is therefore clear that there is a need for a sensorless control method that can work with any power converter circuit using any control strategy. There is also a need for a method that does not require large amounts of stored data or expensive current feedback and is robust in the presence of noise on the waveforms from which it deduces position. Preferably, it does not require any stored magnetization data.

SUMMARY OF THE INVENTION

It is an object of the present invention to provide a robust and cost-effective method of monitoring rotor position without using a rotor position transducer while also reducing the amount of stored data.

A method in which the invention is embodied detects the position where, in motoring, the rotor poles begin to overlap the stator poles (which is the same point in generating where the poles begin to separate). Rather than follow known methods of detecting the zero slope in the phase current at that point, the point at which the current begins to fall, having reached its peak, is detected. Sufficient samples of current are taken to ensure that the true current behavior is being detected and then the point of pole overlap or separation is calculated. Since the sampling rate and calculation times are constant, it is then possible to predict accurately (given the machine speed) the occurrence of the pole overlap in the next phase to be energized. The sampling of current can be done with a low-cost current sensor and, if PWM operation is being used, the sampling can be synchronized with a particular switch state, thus allowing chopping with the switch adjacent to the current sense resistor, if required.

BRIEF DESCRIPTION OF THE DRAWINGS

The invention can be put into practice in a number of ways, some of which will now be described by way of example and with reference to the accompanying drawings in which:

FIG. 4($b$) shows a typical motoring current waveform in single-pulse control;

FIG. 7 shows a current waveform where the current has reached a peak and is falling.

DETAILED DESCRIPTION OF PREFERRED EMBODIMENTS

The phase inductance cycle of a switched reluctance machine is the period of the variation of inductance for the, or each, phase, for example between maxima when the rotor poles and the relevant respective stator poles are fully aligned. The illustrative embodiment to be described uses a 3-phase switched reluctance drive in the motoring mode, but any phase number could be used, with the drive in either motoring or generating mode.

Figure 1:
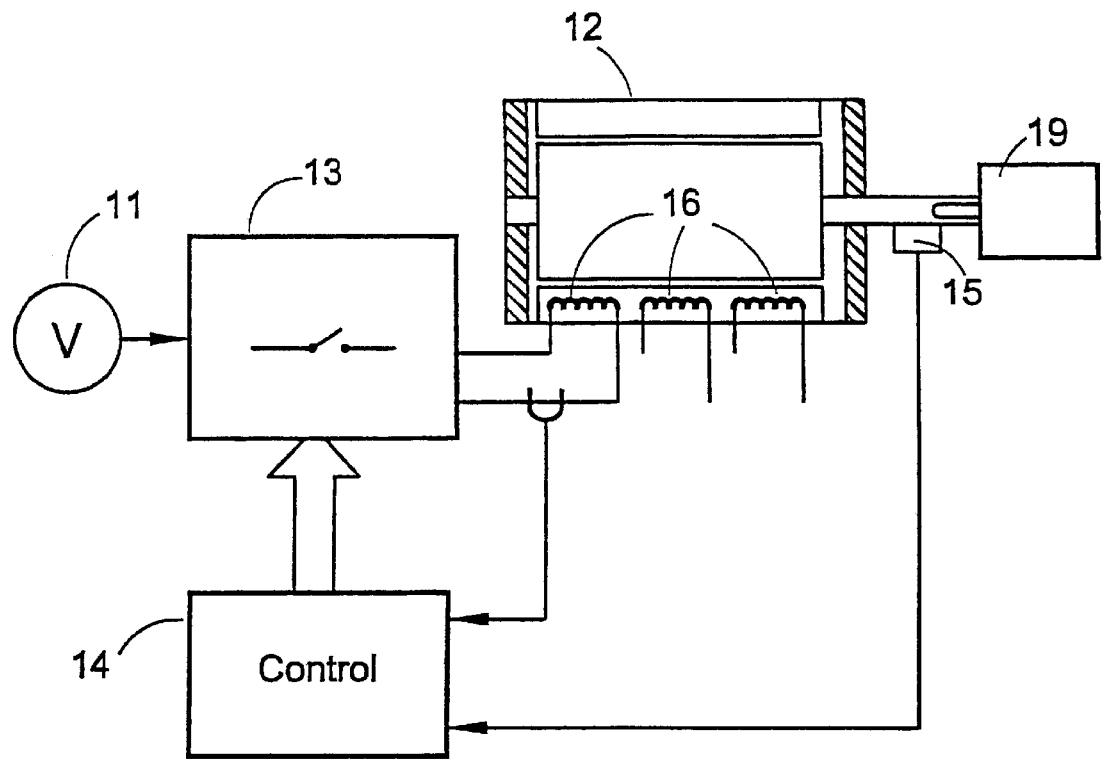
FIG. 1 shows a typical prior art switched reluctance drive.
Figure 5:
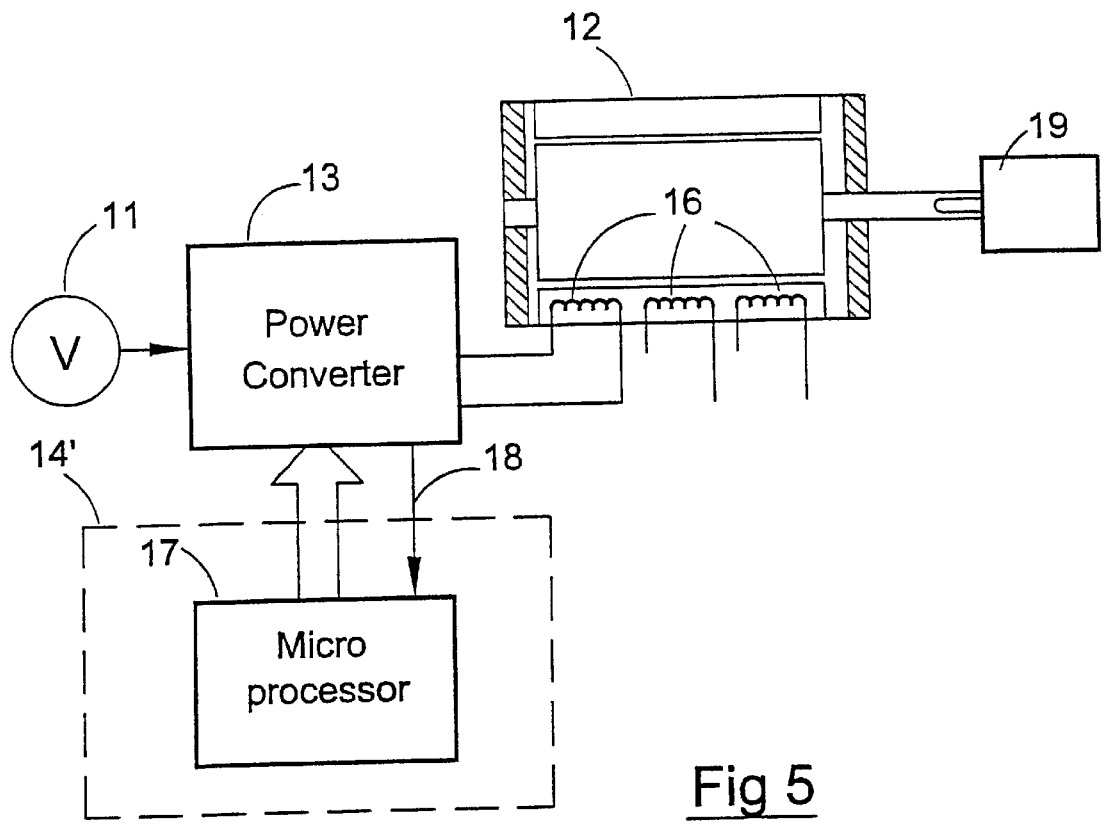
FIG. 5 shows in schematic form a switched reluctance drive, in which the invention is embodied.

FIG. 5 shows a system for implementing a method in which the invention is embodied. In this, a power converter 13, which is typically the same as that shown in FIG. 1, is provided for controlling the switched reluctance machine. Controlling the convertor 13 is a microcontroller 17. For a single-chip solution, the microcontroller 17 must have at least one on-chip analog to digital converter. A suitable component is a Microchip PIC 16C72A. It has an 8-bit 4-channel analog to digital (A/D) converter and is a cheap, versatile microcontroller. The circuit shown in FIG. 5 is suitable for use where low-cost current sensing and PWM operation with bottom switch chopping is used. The signal representing the phase current is fed directly into the input of one of the 8-bit A/D converter channels of the microcontroller 17 on signal line 18. Filtering for noise rejection can be added if required.

The system of FIG. 5 is adapted to detect the rotor position by sampling the phase current, detecting when it has passed its peak and computing when the peak current happened by monitoring the gradient of a plot of current against time. When the gradient becomes negative, this indicates that the peak has been passed and allows a measure of the rotor position. This is a robust method, which overcomes disadvantages of the prior art.

The phase current information in the system of FIG. 5 can be provided from, for example, a Hall effect device or from the resistive sensor 28, which is in series with the lower switch 22. If the phase current information is provided from a Hall-effect device or if the machine is working in true single-pulse mode, information representing the magnitude of the current is present all the time and samples can be taken anywhere within the conduction period.

However, if the current feedback is from the resistive sensor 28 in series with the lower switch 22 and the machine is being run on a PWM supply using bottom switch chopping, it is important that the sampling is synchronized to the periods when the switch is on and current information is present.

Figure 6:
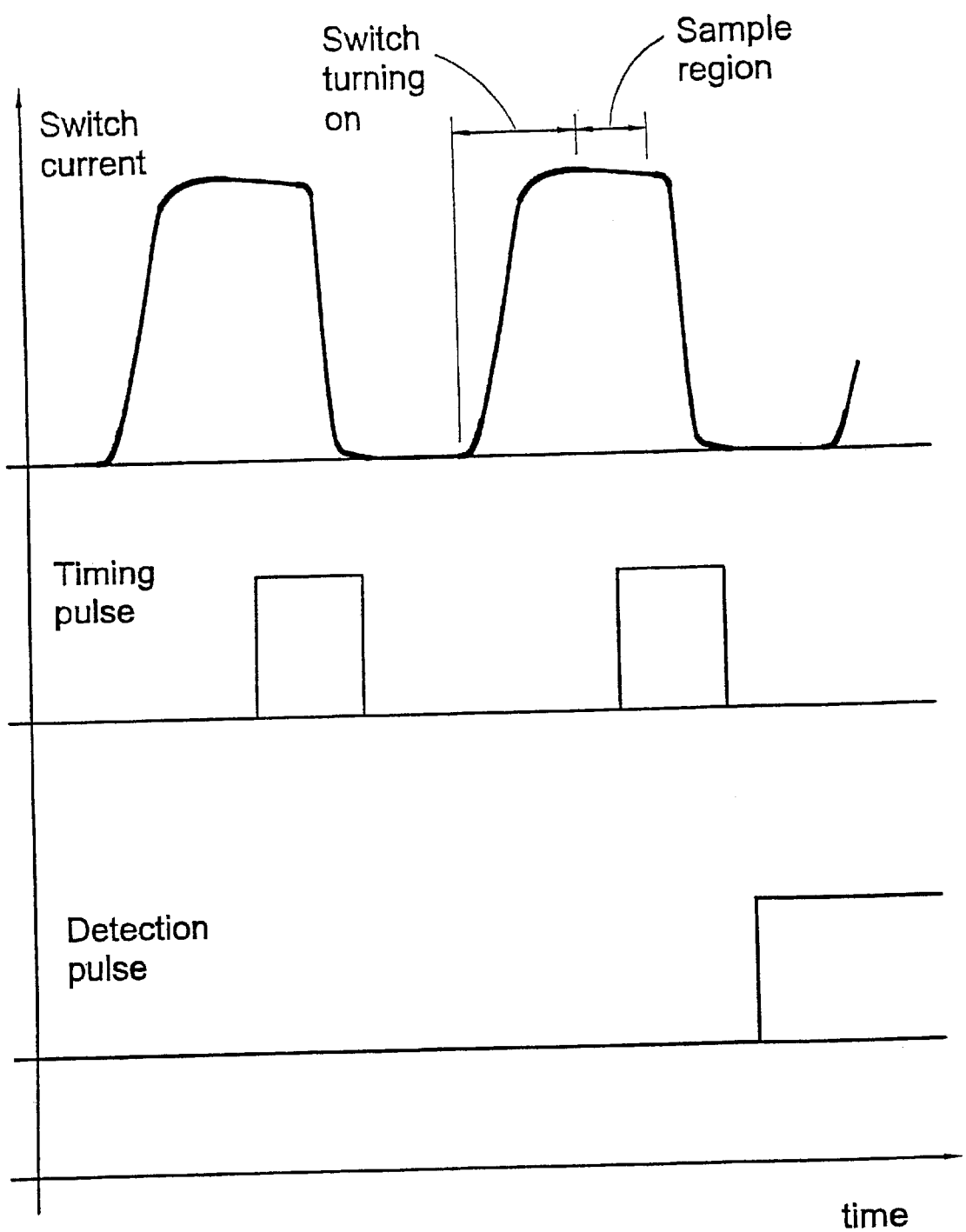
FIG. 6 shows current and pulse waveforms in the drive of FIG. 5.

FIG. 6 shows waveforms from the machine of FIG. 5. For the sake of clarity, the timebase of the figure has been greatly expanded. The bottom switch 22 current is shown and the PWM frequency in this example is 20 kHz. It can be clearly seen that the current rises rapidly as the switch 22 is turning on and picking up the phase current from the diodes 23 and 24. Once on, the current in the switch 22 equals the phase current, and this is the region where the current sample or samples need to be taken to obtain a correct reading. The timing pulse is a signal whose rising edge is used to define the point at which the sample is actually taken. This clearly shows that the sample is synchronized to the turn on of the switch 22 and samples a predetermined amount of time after the switch has turned on. This delay before sampling is deliberate and can be adjusted. An alternative embodiment, which may be more convenient, is to dispense with the timing pulse and allow the microprocessor to time out a pre-set delay triggered from the firing pulse for the switch, after which a sample is taken.

In the example shown in FIG. 6, the two switch current pulses are equal in magnitude, indicating that pole overlap has been reached. The lowest trace shows the actual sensorless detection pulse generated by the microprocessor 17. It can be seen that the transition in this trace is delayed from the point of sample due to the computation time required for the A/D to finish its conversion and the PIC to determine whether or not the desired position has been reached.

The simplest form of implementation within the PIC is to use a logical differentiator. Every time a sample is taken, it is compared with the previous sample. If both samples are equal, then there has been no change in the magnitude of the current waveform. Hence, the point of zero di/dt has been reached which, as described in the Gallegos-Lopez paper, is assumed to be the point of pole overlap or separation, depending on whether the machine is motoring or generating. However, as mentioned previously, while detection of the zero di/dt seems like an ideal solution to the sensorless issue, in practice it has limitations and is unreliable. One problem of using this method in the system of FIG. 5 is due to the limitations of the A/D converter. At high speeds, there are a limited number of samples that can be taken within the conduction period at a fixed frequency. There is, therefore, little chance that there will be sufficient samples to obtain two of equal amplitude for the processor algorithm to detect a zero difference at the point of pole overlap. At low speeds, the algorithm fails due to the amplitude resolution of the A/D being only 8 bits. Although many samples may be taken close together and the rate at which the current is changing in relation to the sample time and frequency is low, it is probable that the slowly changing waveform will not have changed by 1 least significant bits worth of amplitude and so the A/D detects the same level of amplitude on successive samples. The circuit therefore assumes a point of zero di/dt and outputs a detection pulse indicating pole overlap. Although it would be easy to lock out zero di/dt detection after the first pulse is given to stop multiple pulses, this first one could well be in completely the wrong place. A higher resolution (and more costly) A/D would improve the performance, but would still suffer the same problem at some lower speed.

As previously mentioned, a more robust approach is to use a method of slope detection which detects the onset of the downwards slope after the peak current has been reached. Though this inevitably inserts a delay in detection of the point of pole overlap, the delay is, in fact, constant and this can be compensated for in the controller. The controller can therefore predict exactly when the next point of pole overlap will be encountered.

In order to perform slope detection, the microprocessor 17 includes an algorithm that compares a sample with the previous sample (as in the implementation described earlier). However, rather than looking for two equal samples, it ignores all the samples equal to, or greater than, the previous one (i.e. when the waveform is increasing or is flat). Once the point is reached where the present sample is less than the previous sample, it can be assumed that the peak (zero di/dt) point has been reached and the waveform is now falling with a negative slope. This technique generates a sensorless detection pulse typically two samples after the true peak, with the sampling time being a fixed known quantity. This known time of two sample periods can then be compensated in the angle control software. FIG. 7 shows a typical waveform on which the algorithm would work: the Figure shows two current pulses of equal magnitude, followed by gradually reducing pulses, indicating that the current has passed its peak and the gradient is now negative.

This approach works quite well in practice but, though it is markedly better than the method used by Gallegos-Lopez, it has been found that the system can occasionally be fooled into detecting a false point if there is sufficient noise on the current detection signal. Improved performance can be achieved by modifying the algorithm to detect a continuous negative slope over several samples, rather than assuming that the first negative slope computed is the true first sample after the peak of the current waveform. By looking for, say, two or more negative slope results from the samples and ignoring any zero change results (due to slow rates of change at low speed and poor A/D resolution), it is safe to assume that the slope is definitely falling. The detection pulse is further delayed after the point of zero di/dt by a minimum of three samples, but this can be compensated for in the SR control as it is a known quantity of time.

This approach can potentially add some slight inaccuracy at low speeds when the waveform changes slowly and multiple samples of the same level (due to the poor A/D resolution) could result, thus increasing the delay of the pulse from the true point of zero di/dt. However, for this to happen, the speeds would be very low indeed for the waveform to change so slowly, and the actual delay would be negligible in terms of rotor angle, so that the slight inaccuracy of position detection is not a problem. In practice, the algorithm works consistently in a robust manner. In theory, 'n' negative slope detections can be used where 'n' is an integer from 2 to the maximum number of samples that can fit into the conduction region after the point of zero di/dt. In practice, n=4 or 5 would produce an extremely robust system, capable of giving accurate detection in the presence of substantial noise on the current signal. However, n=2 still works very well with an 8 bit resolution A/D.

At high speeds, a different problem arises. If the speed of the machine is very high then the sample rate may not allow enough samples in the conduction period to ensure that the peak is accurately detected. However, at this point some robustness can be traded off for increased speed range by successively reducing the number of negative slope detections as the speed rises. The controller can be programmed to vary the number of negative slope detections according to the band in which the speed lies according to the following example:

| Speed range | Detections |
| --- | --- |
| 200–1000 | 5 |
| 1000–2000 | 4 |
| 2000–10000 | 3 |
| 10000–15000 | 2 |

The exact values will naturally depend on the phase number of the drive, the PWM frequency, the overall speed range, etc, as will readily be appreciated by the skilled person.

It will be appreciated that, in all the embodiments described above, the step of calculating rotor position from the discovered position of peak current is relatively simple. The position of pole overlap is fixed by the pole arc geometry of the machine and, as described earlier, it is known that this is substantially the position at which the peak current occurs. Hence, the actual rotor position is given by the simple addition of the position displacement that corresponds to the rotor speed and the known time required to complete the sampling.

Figure 2:
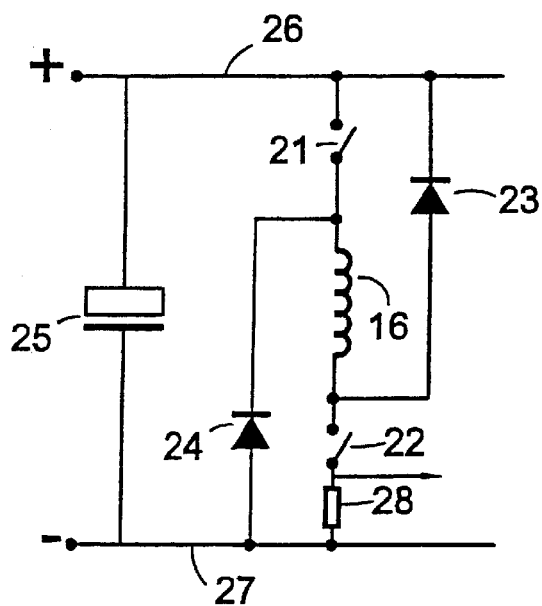
FIG. 2 shows a known topology of one phase of the converter of FIG. 1.
Figure 3:
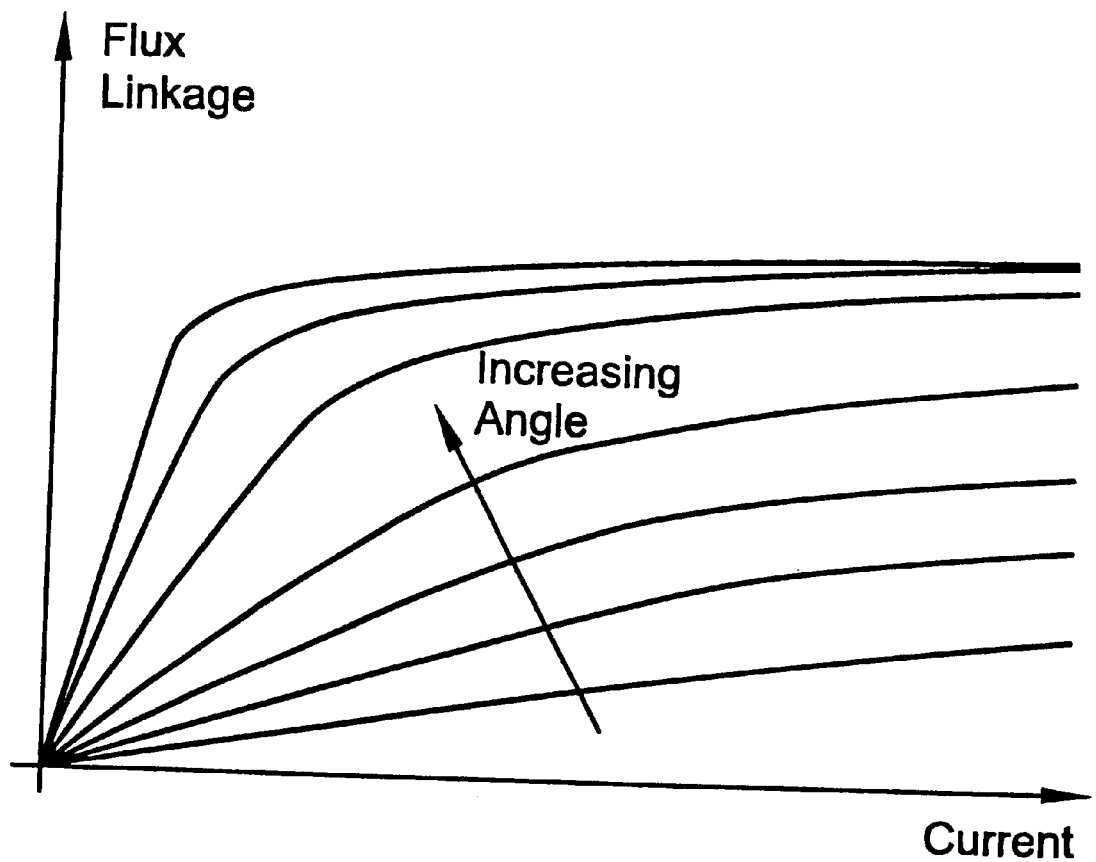
FIG. 3 shows typical flux-linkage vs. phase current curves, with rotor position as a parameter.
Figure 4A:
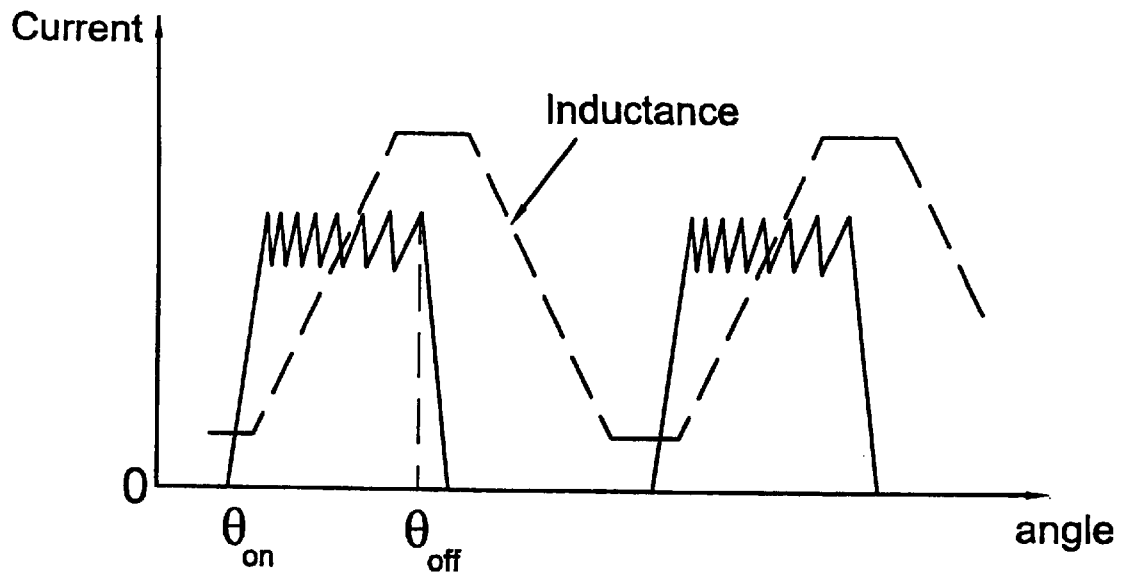
FIG. 4($a$) shows a typical motoring current waveform in chopping control.
Figure 4B:
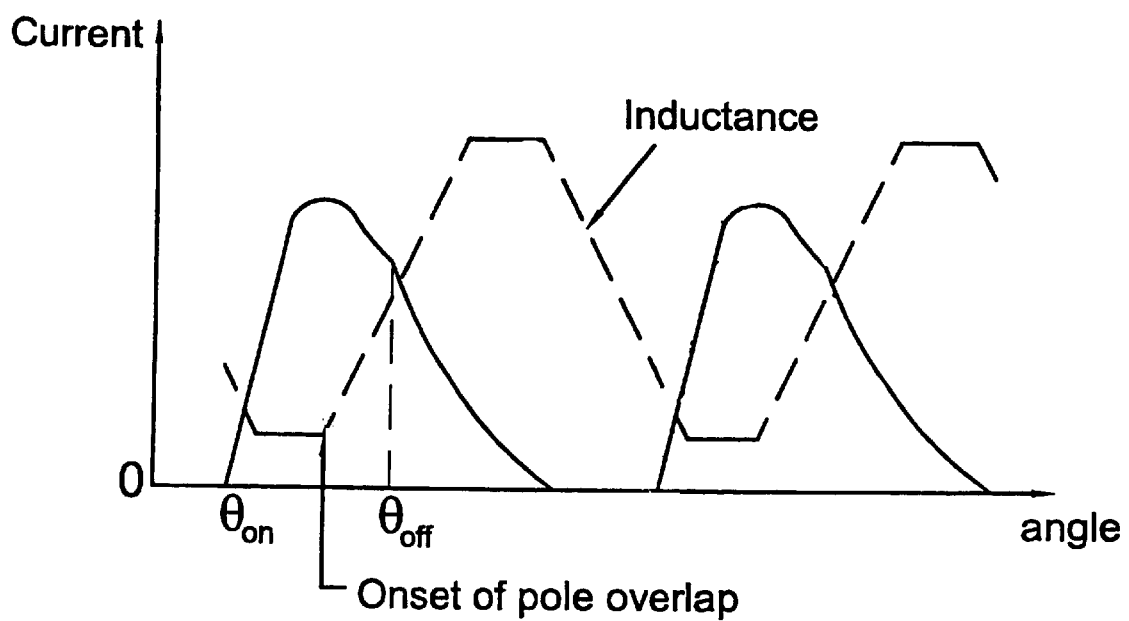
Figure 8:
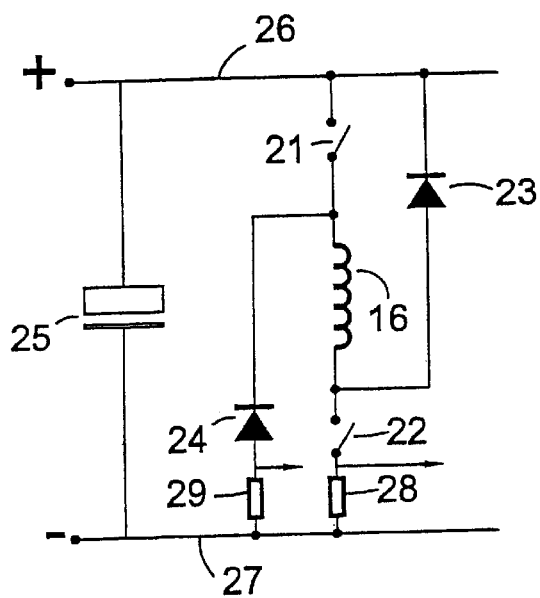
FIG. 8 shows a converter topology for the drive of FIG. 5, which is suitable for operation in both motoring and generating modes.

The example described above has been for the motoring mode of operation. It will be appreciated that the technique can be used to equal effect in the generating mode. In this case it is appropriate to feed back a measure of current while the diode(s) are conducting, so a phase leg topology such as shown in FIG. 8 is suitable. This circuit is similar to that of FIG. 2, but includes an additional current sensor 29 in series with diode 24. The feedback signal from sensor 29 can either be fed to a second A/D channel in the microprocessor or multiplexed using a known technique into signal line 18 of FIG. 5. By sampling the current in diode 24, the controller is able to detect the point of pole separation using the method described above and thereby determine the rotor position.

The technique is not restricted to the arrangement of FIG. 8. If the current waveforms are such that a current sensor, arranged to sense the combined currents of all the phases, provides a signal that can uniquely identify the individual currents, then the invention can be applied to this arrangement.

As will be appreciated, the switched reluctance drive in which the invention is embodied can be controlled without using a physical rotor position detector. This can be done because the control method continuously samples the current waveform using current feedback from a simple, non-isolated current sensor; detects the point at which the slope of the current waveform goes negative; uses this information to compute the point at which the slope was previously zero and uses the computed zero slope point to calculate rotor position. This is a simple and robust method.

The skilled person will appreciate that variations of the disclosed arrangements are possible without departing from the invention, particularly in the details of the implementation of the algorithm in the microprocessor. Accordingly, the above description of several embodiments is made by way of example and not for the purposes of limitation. It will be clear to the skilled person that minor modifications can be made to the drive circuit without significant changes to the operation described above. The present invention is intended to be limited only by the scope of the following claims.

What is claimed is:

1. A method for sensorless determination of rotor position in a reluctance drive comprising a rotor with a plurality of rotor poles and a stator with a plurality of stator poles, the poles of one of the rotor and stator being provided with windings defining a plurality of phases, the method comprising:

sampling phase current within a conduction period of a phase, detecting when the phase current within the conduction period has passed its peak, computing when the peak phase current occurred using information on when the phase current passed its peak, and determining rotor position using the computed peak current.

2. A method as claimed in claim 1, wherein detecting when the phase current passed its peak includes monitoring the rate of change of current against time.

3. A method as claimed in claim 2, wherein a rate at which the phase current is sampled is dependent on the speed of the rotor.

4. A method as claimed in claim 3, comprising:

monitoring the speed of the rotor, and varying the sample rate depending on the monitored speed.

5. A method as claimed in claim 3, wherein the sampling is done using an analog to digital converter.

6. A method as claimed in claim 1, wherein the sampling of phase current includes using a sensor comprising a resistor.

7. A method as claimed in claim 6, used in a drive that is supplied from a power converter that has at least one switch connected to a zero voltage line through the resistor, wherein the sampling of the current is synchronized with a switching cycle of the switch.

8. A method as claimed in claim 1, wherein the drive is a switched reluctance drive.

9. A method as claimed in claim 1, wherein the drive is operated in a motoring mode or a generating mode.

10. A reluctance drive with sensorless determination of rotor position, comprising:

a stator, a rotor that is movable relative to the stator, a phase winding on one of the stator and rotor, the phase winding defining a phase, a controller for applying a current to the phase winding, means for measuring phase current in the winding within a conduction period of the phase, means for detecting when the phase current within the conduction period has passed its peak, means for computing when the peak phase current occurred using information on when the phase current passed its peak, and means for computing rotor position using the computed position of the peak phase current.

11. A reluctance drive as claimed in claim 10, wherein the means for detecting when the phase current has passed its peak is operable to monitor the rate of change of phase current against time.

12. A reluctance drive as claimed in claim 11, wherein the means for detecting when the phase current has passed its peak includes means for sampling the phase current at discrete intervals of time.

13. A reluctance drive as claimed in claim 12, wherein at least one negative slope in the rate of change of phase current against time indicates that the current has passed its peak value.

14. A reluctance drive as claimed in claim 12, wherein a sample rate of the means for sampling is dependent on the speed of the rotor.

15. A reluctance drive as claimed in claim 14, comprising means for monitoring the speed of the rotor and varying the sample rate according to the monitored speed.

16. A reluctance drive as claimed in claim 12, wherein the means for sampling is an analog to digital converter.

17. A reluctance drive as claimed in claim 10, wherein the means for detecting is provided in a microprocessor.

18. A reluctance drive as claimed in claim 17, wherein the microprocessor is a Microchip PIC 16C72A.

19. A reluctance drive as claimed in claim 10, wherein the sampling of phase current includes using a sensor comprising a resistor.

20. A reluctance drive as claimed in claim 12, wherein the drive is a switched reluctance drive that is supplied by a power converter having at least one switch connected to a zero voltage line through the resistor and the means for sampling the phase current is synchronized with a switching cycle of the switch.

21. A computer program, on a data carrier or other computer-readable medium, for sensorless determination of rotor position in a reluctance machine, the computer program having instructions for controlling sampling of phase current within a conduction period of a phase of the reluctance machine, detecting when the phase current within the conduction period has passed its peak, computing when the peak phase current occurred using information on when the phase current passed its peak and determining rotor position using the computed peak phase current.

22. A computer program as claimed in claim 21, wherein detecting when the phase current passed its peak includes controlling the sampling to monitor the rate of change of current against time.

23. A computer program as claimed in claim 22, wherein the instructions for controlling set a sample rate depending on the speed of the rotor.

24. A computer program as claimed in claim 23, comprising instructions for noting a measured speed of the rotor and varying the sample rate depending on the measured speed.

25. A computer program as claimed in claim 24 adapted to control a drive that is supplied from a power converter having at least one switch connected to a zero voltage line through a resistive current sensor, wherein the computer program is adapted to control sampling of the current so that it is synchronized with a switching cycle of the switch.

* * * * *